United States Patent

[11] 3,542,320

| [72] | Inventor | Durrell U. Howard,<br>306 Krameria Drive, San Antonio, Texas 78213 |
|---|---|---|
| [21] | Appl. No. | 756,556 |
| [22] | Filed | Aug. 30, 1968 |
| [45] | Patented | Nov. 24, 1970 |

[54] AIRCRAFT MAIN SPAR MODIFICATION
11 Claims, 10 Drawing Figs.

| [52] | U.S. Cl. | 244/123 |
|---|---|---|
| [51] | Int. Cl. | B64c 3/18 |
| [50] | Field of Search | 244/123, 124 |

[56] References Cited
UNITED STATES PATENTS

| 1,061,917 | 5/1913 | Malterner | 244/124 |
|---|---|---|---|
| 2,014,801 | 9/1935 | Flader | 244/123 |
| 2,078,544 | 4/1937 | Salzman et al. | 244/123 |
| 2,386,019 | 10/1945 | Watter | 244/123 |

Primary Examiner—Milton Buchler
Assistant Examiner—Steven W. Weinrieb
Attorneys—William D. Hall, Elliott I. Pollock, Fred C. Philpitt, George Vande Sande, Charles F. Steininger and Robert R. Priddy ABSTRACT: A modification for the main wing spar of aircraft, particularly the aircraft designated as Beechcraft Model 18, comprising an elongate strap which is affixed to the lower spar cap, but is external of the skin on the belly of the aircraft. The auxiliary strap is placed in tension, thereby compressing the lower spar cap so that in response to positive gravity loads on the wings, the lower spar cap is subjected to tension forces substantially only one-half of that normally encountered. To stabilize the forces at the end of the auxiliary strap, an L-shaped member is employed, whose longer lever arm is secured to the top wing attach bolt. Means are also provided to minimize bending moments on the lower spar cap, resulting from the affixing thereto of the auxiliary strap.

Patented Nov. 24, 1970

INVENTOR
Durrell U. Howard

BY
HIS ATTORNEY

INVENTOR
Durrell U. Howard

BY *George Vander Sande*

HIS ATTORNEY

INVENTOR
Durrell U. Howard

BY *George Vander Sande*

HIS ATTORNEY

Patented Nov. 24, 1970

3,542,320

INVENTOR
Durrell U. Howard

BY Jerry Vander Sande

HIS ATTORNEY

AIRCRAFT MAIN SPAR MODIFICATION

BACKGROUND OF THE INVENTION

It is common practice in the art of aircraft manufacture to form the main wing spar of tubular members which are welded together to form a truss. The wing spar may comprise lower and upper spar cap members, together with vertical and diagonal bracing members. Such a trusslike structure must be able to withstand severe tension and compression forces, since the aircraft wings are attached to the truss at the ends thereof. Positive gravity or "g" loads generally result in compression of the upper spar cap and tension in the lower spar cap, but obviously negative "g" loads produce the opposite forces in these respective members.

Ordinarily, such a truss structure is able to withstand the application of variable forces indefinitely, and an aircraft may be operated for many thousands of hours without experiencing any defects in the main wing spar structure. However, since the tubular members are secured together, for the most part, by welding, and since it is known that welding will produce changes in the characteristics of the crystalline structure of the metals employed, it will occasionally happen that such a wing spar will experience cracks which may spread and eventually result in failure of a member. Thus, the tubular members of which the wing spar is formed are especially heat treated to give a very high-tensile strength; as such they are not particularly ductile and may have impaired fatigue characteristics.

It may at first appear that this situation can most readily be corrected by rewelding the members involved. This, however, is often not a satisfactory solution since the application of intense heat as a result of the welding process to the various members of the wing spar tends to destroy the properties resulting from the original heat treatment of the members, thereby still further endangering the integrity of the wing spar members. Moreover, if the weld is not perfect, a high-stress concentration may well occur at the site of the imperfection. For this reason, strict regulations have been promulgated by the Federal Aviation Administration, prohibiting welding of the main wing spar assembly, except under certain stringent conditions. However, even careful welding does not provide a satisfactory solution to the problem; thus, since any possible deleterious effects of the welding are generally invisible, periodic inspections must still be made of the structure, so as to detect any further evidences of failure.

Federal regulatory agencies ordinarily require that any condition possibly causing structural failure be fully corrected in order that the aircraft can be considered as being airworthy. Under some conditions, the aircraft involved is considered as being airworthy only if periodic inspections are made to determine whether the specific condition is becoming apparent on a particular aircraft.

In any event, the situation is one which requires a prompt and effective solution, since owners of such aircraft are reluctant to make further use of them until the possibly unsafe condition is corrected, and this not only takes such airplanes out of service, but this also greatly depresses their value. Any proposed solution which requires that the aircraft be subject to periodic inspections may well not represent a satisfactory solution, particularly if the inspection involves considerable expense and involves considerable down time for the aircraft.

One such specific instance involves the Model 18 Beechcraft, a low-wing twin-engine aircraft, of which several thousand have been produced in the United States over a period of many years. Several aircraft of this type have experienced fracture of the lower spar cap included in the main wing spar assembly, often with fatal results. Several solutions to the problem have been proposed, but substantially all of these proposals requires, by Government regulation, that the aircraft undergo a thorough inspection each 500 hours of flight to determine whether the full structural integrity of the wing spar is being maintained. Since the main wing spar is embedded within the fuselage, it will be apparent that any such requirement for inspections at periodic intervals leaves much to be desired for reasons referred to above.

SUMMARY OF THE INVENTION

The above general discussion is provided to emphasize the important advantages attending the use of the modification of the present invention. Thus, the invention comprises generally the use of a steel strap which is mounted on the underside of the aircraft, external of the fuselage belly and lower wing skin of the aircraft, and covered with a fairing so that there is substantially no effect upon the aerodynamic characteristics of the craft. The strap is secured at intervals to the lower spar cap, and is coupled to a means which permits placing the auxiliary strap in tension, thereby placing a compressive load upon the lower spar cap. Both the lower spar cap and the auxiliary strap are operatively connected to an L-shaped member, the end of whose longer leg is attached to the top wing attach pin, thereby providing a long lever arm which places a light tension load upon the upper spar cap, which tends partially to relieve the compression in that member.

The modification of the present invention in no way requires the welding, drilling, or cutting of any members onto the original wing spar assembly. The auxiliary strap is clamped at intervals to the lower spar cap through access apertures formed in the aircraft belly skin. The various clamp blocks which properly space the auxiliary strap from the lower spar cap are adapted to be positioned closely adjacent each welded cluster of tubes forming the trusslike structure, so that a minimum bending moment is applied to the lower spar cap adjacent each such cluster.

The resulting aircraft modification in accordance with the present invention is one which, by Government approval, completely dispenses with the need for further inspection of the wing spar at regular intervals. The modified structure is fail-safe in that, in the event of failure of either the lower spar cap or the strap, the remaining member is able to withstand the resulting load. The modification adds but little weight to the aircraft, thereby having only minimal effect upon the useful load which can be carried, and having substantially no effect upon the aerodynamic characteristics of the aircraft. It can be mounted upon an aircraft with relative simplicity, in view of the fact that the auxiliary strap is external of the belly skin. The means for coupling the strap at its ends to the main wing spar are simple in construction and are accessible through the wheel wells, thereby facilitating installation and adjustment of the tension forces on the auxiliary strap.

BRIEF DESCRIPTION OF THE DRAWINGS

In describing the invention in detail, reference will be made to the accompanying drawings in which:

FIG. 7 is a view of the auxiliary strap shown in FIG. 1;

FIG. 8 is a top view of the strap of FIG. 7;

DETAILED DESCRIPTION OF THE PREFERRED EMBODIMENT

Figure 1:
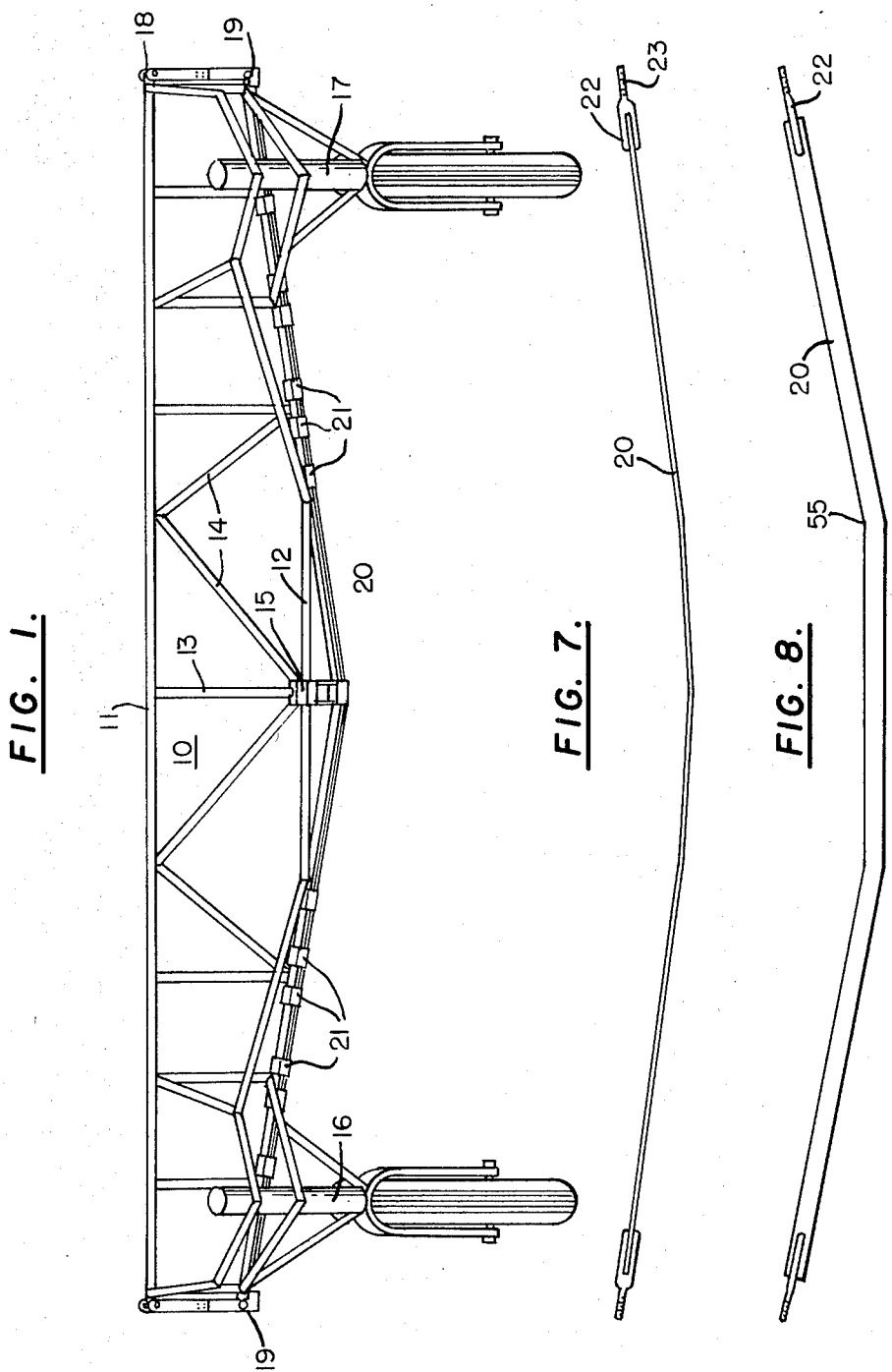
FIG. 1 is a front view of the main wing spar of an aircraft, showing the modification thereof in accordance with the present invention.

FIG. 1 illustrates the main wing spar assembly, generally at 10, and this assembly is shown as comprising an upper spar cap 11 and a lower spar cap 12. At intervals along the length of these members, vertical tubes 13 are provided, and these are welded to both the upper and lower spar caps 11 and 12. In a similar fashion, diagonal members 14 are welded between the upper and lower spar caps. At various places, a plurality of tubes are welded together in a cluster, as for example at 15 where there are welded together five different tubes, including the lower spar cap 12. It is at such locations that the large amount of welding required has the greatest possibly deleterious effect upon the annealed metals used, so that there is at this point perhaps the greatest possibility of an incipient failure occuring in the integrity of the metal structure.

The main spar assembly of FIG. 1 supports the right and left main landing gear 16 and 17, and at the extremities of the trusslike structure shown in FIG. 1, there are provided horizontal upper and lower wing attach bolts 18 and 19, to which the wings are secured.

Generally, a failure of the main wing spar occurs in the form of a crack in the lower spar cap 12, since this member is subjected to high-tension loads as a result of positive "g" loading on the wings. It is, therefore, one of the principal objects of this invention to provide a modification which will very significantly reduce the loading on the lower spar cap. As shown in FIG. 1, the modification takes the form of an auxiliary strap 20, which is mechanically coupled to the lower wing attach pins 19 and 19' by a means which will be described in greater detail subsequently.

The auxiliary strap 20 is also coupled mechanically to the lower spar cap 12 by means of a plurality of clamp blocks 21, whose construction will later be described in greater detail in connection with FIG. 4. Principally, the effect of these clamp blocks is not to provide a restraining force acting on the auxiliary strap 20 in opposition to the tension forces applied thereto, but to provide appropriate spacing between the auxiliary strap 20 and the lower spar cap 12. Thus, it should be appreciated that the wings of modern-day aircraft are provided with dihedral, and are also provided with some degree of sweepback of the wings. Because of the dihedral, the lower spar cap 12 is formed with a slightly upward sweep toward its end portions, and the strap 20 which generally follows the contours of the lower spar cap 12, also, therefore, has some dihedral to it as well. In addition, the sweepback of the wings means that the lower spar cap 12 does not lie in the same vertical plane over its entire length, but is instead swept back somewhat also, and because of this the strap 20 is required to have a partially sweptback configuration to correspond with that of the lower spar cap 12.

FIG. 7 further illustrates how the strap 20 is secured to a threaded pin element 22 at each end thereof. The member 22 is provided with an elongate slot which receives the end of strap 20. The elements 20 and 22 are then securely fastened together by welding.

Figure 2:
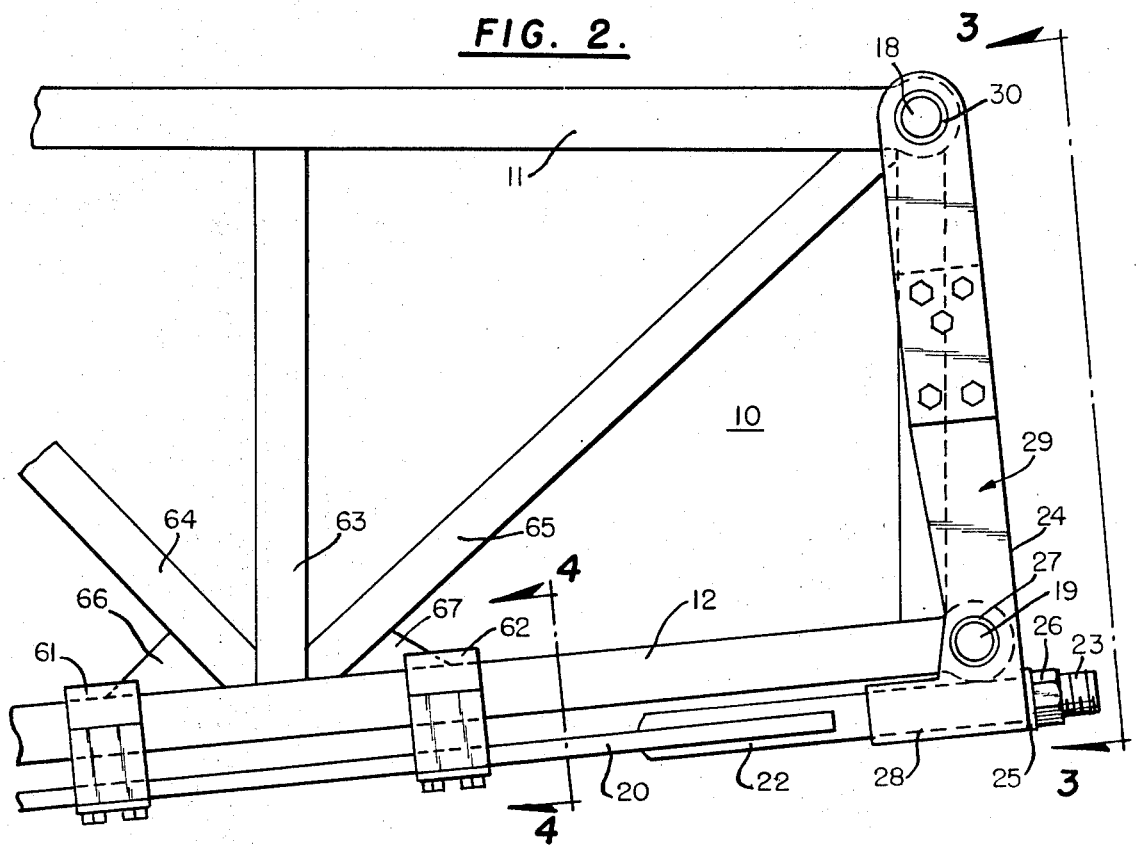
FIG. 2 is an expanded view of the end portion of the main wing spar of FIG. 1, illustrating particularly the manner in which the forces in the lower spar cap and auxiliary strap are equalized by an L-shaped member secured to the top wing attach pin.

FIG. 2 illustrates in greater detail the manner of securing the strap 20 to the wing spar 10. Thus, the threaded end portion 23 of member 22 passes through an aperture 28 defined in a bifurcated L-shaped member 24. A washer 25 and nut 26 are placed in turn over the threaded end which protrudes from the aperture in member 24 as shown. An aperture 27 is also defined in the L-shaped member 24 at right angles to the aperture 28. The aperture 27 is adapted to receive the lower wing attach pin 19. The long leg portion 29 of member 24 further defines an aperture therein at 30 which aperture is parallel to the aperture 27. The latter aperture 30 is adapted to receive the upper wing attach pin 18.

When the spar modification strap 20 is affixed in place, and with the L-shaped member 24 fitted over the upper and lower wing attach pins 31 and 28, respectively, the nut 26 is threaded onto the threaded portion 23 of member 22, thereby placing strap 20 in tension and compressing the lower spar cap 12. By experimentation, one can determine the amount of torque to exert on nut 26 in order to place sufficient tension on strap 20 in order that the resulting compression of lower spar cap 12 will result in its bearing only one-half of the load to which it would otherwise be subject, with strap 20 bearing the remainder of the load.

Figure 3:
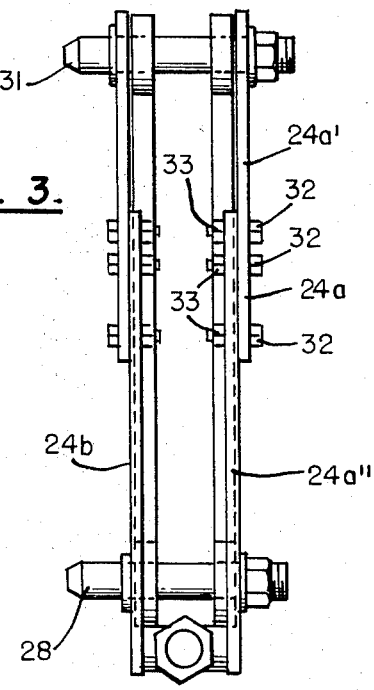
FIG. 3 is a side view of FIG. 2 as taken along the section line 3—3.

The importance of the L-shaped member and its attachment at the end of the long leg thereof to the upper wing attach pin 21 can readily be appreciated by one skilled in the art. Thus, by placing strap 20 in tension and the lower spar cap 12 in compression, a turning moment is produced at the terminal end of the lower spar cap 20, which turning moment must be counteracted in order to avoid the imposition of strains in the wing spar itself. The long lever arm 29 of member 24 makes it possible to carry this force upwardly to the upper wing attach pin 31, where little force is required to counteract the turning moment because of the long lever arm of member 24. As can be seen from FIGS. 2 and 3, the L-shaped member 24 is comprised essentially of two separate portions, 24a and 24b, each of which is secured about the upper and lower wing attach pins 28 and 31 on opposite sides of the lower spar cap 12, so as to properly distribute the resulting forces. Moreover, each member, such as member 24a, is comprised of two separate sections, 24a' and 24a", which are coupled together at their extremities, between the upper and lower spar caps 12 and 11, by means of threaded bolts 32 which pass therethrough and are secured at the opposite side by nuts 33. Since the distance between the upper and lower wing attach bolts is not necessarily exactly the same on all aircraft of the same type, this arrangement permits adapting the L-shaped member to each particular aircraft. Thus, the upper and lower portions 24a' and 24a" may both be placed in position on the respective upper and lower wing attach bolts, and then the respectively opposite ends of these members may be drilled to receive the bolts 32.

Figure 4:
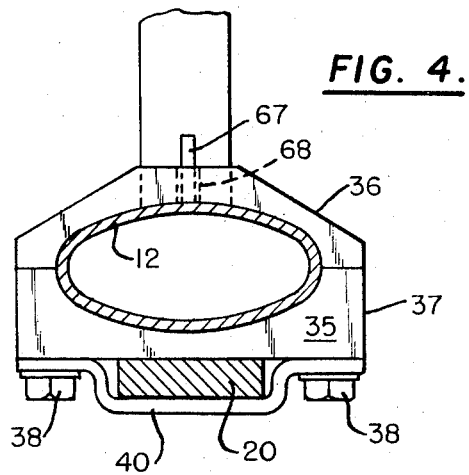
FIG. 4 is a cross-sectional view taken along the section line 4—4 of FIG. 2.

FIG. 4 illustrates the manner in which the auxiliary strap 20 is coupled to the lower spar cap 12 along its length. Thus, at predetermined intervals, a clamp block assembly 35 is provided, which comprises two portions 36 and 37, which may be coupled together by means of bolts 38 passing through apertures in the lower portion of the block and into threaded apertures (not shown) in the upper portion 36 of the block.

Bolt 38 also secures clamping member 40 to the lower portion 37, and this clamping member 40 is so shaped that it fits securely about the strap 20 and holds it in place against the bottom, plane surface of the lower member 37. The plurality of clamping means of the type illustrated in FIG. 4 have the function of maintaining a predetermined spacing between the strap 20 and spar cap 12, but are not intended to provide a strong restraining force against tension forces in the strap 20.

As shown in FIGS. 1 and 2, the clamp block assemblies are, for the most part, secured to the lower spar cap 12, in a position as close to each cluster of welded tubes as possible. Thus, referring particularly to FIG. 2, it can be seen that the clamp block assemblies 61 and 62 are positioned closely adjacent the cluster of tubes comprising the lower spar cap 12, vertical member 63, and diagonal members 64 and 65. Also, it will be noted that weblike members 66 and 67 are welded between each of the diagonal members 64 and 65, respectively, and the lower spar cap 12 for the purpose of adding extra strength to the tube cluster. In order that the clamp block assembly 61 and 62 can be positioned as closely as possible adjacent the cluster, those clamp block assemblies which are intended for use in such a location are provided with slots 68 in the top portion which will receive the weblike element 66 or 67. The reason for doing this is to minimize, insofar as possible, the application of bending moments to the lower spar cap 12. Thus, if each clamp block assembly were secured to the lower spar cap 12 at a point remote from the cluster of tubes, any forces other than purely tensile forces in the strap 20 would result in the imposition of a bending moment from the strap 20, through one or more of the clamp block assemblies, and thence directly to the lower spar cap 12. Such bending moments are reduced by locating the clamp block assembly as closely adjacent each cluster of tubes as possible in order to provide as small a moment arm as possible.

Figure 5:
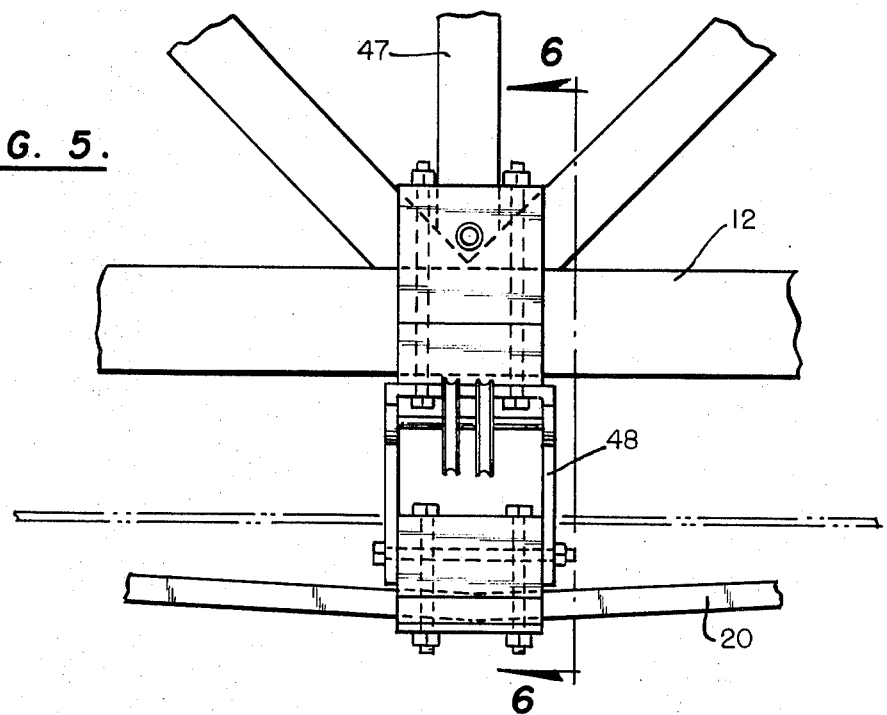
FIG. 5 is a detailed view of the modification of the present invention as it appears along the center of the wing spar of FIG. 1.
Figure 6:
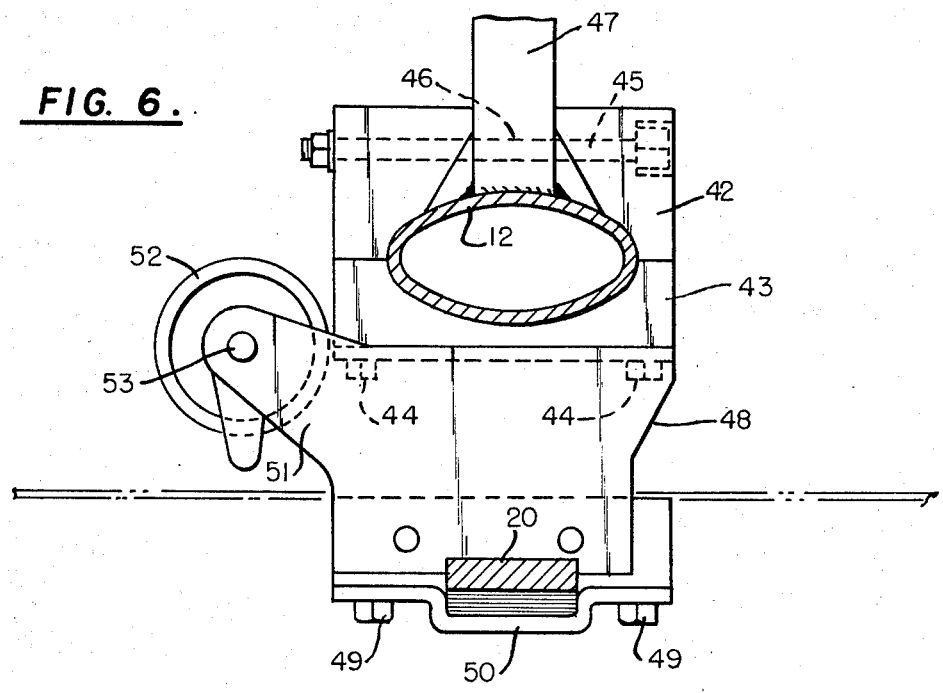
FIG. 6 is a detailed view taken along the line 6—6 of FIG. 5.

FIGS. 5 and 6 illustrate the manner in which the spar cap 12 and strap 20 are coupled together at the center of the wing spar. At this location, provision must be made for a plurality of pulleys which guide various control cables extending from the pilot's controls to the various aircraft control surfaces. Normally, a bolt is passed through an aperture 46 in one of the tubular spar members and supports a bracket, which bracket in turn supports the pulleys mentioned above. However, when the spar modification of the present invention is installed, an alternative means for support of the pulleys is required. This is accomplished, as shown in FIGS. 5 and 6, by providing two members 42 and 43, which are so contoured as to fit closely about the lower spar cap 12. The two members 42 and 43 are secured together by bolts 44. In addition, a bolt 45 passes in a transverse direction through the upper member 42, and through the transverse aperture 46 normally provided in the vertical spar member 47. Secured to the lower member 43 also by means of the bolt 44 is a further bracket member 48, which is generally of U-shaped configuration, as shown in FIG. 5. Secured to the member 48 by means of bolts 49 is a member 50, which is contoured to fit about the strap 20, and thereby maintain the strap 20 in place at a predetermined distance from the lower spar cap 12.

The member 48 includes two forwardly protruding portions 51, each of which is integral with a respective leg portion of the U-shaped member 48, and this portion 51 provides a means for supporting a pair of pulleys 52 which are journalled at 53. Control cables extending longitudinally into the fuselage pass over the pulley 52 and between the legs of the U-shaped member 48.

Figure 9:
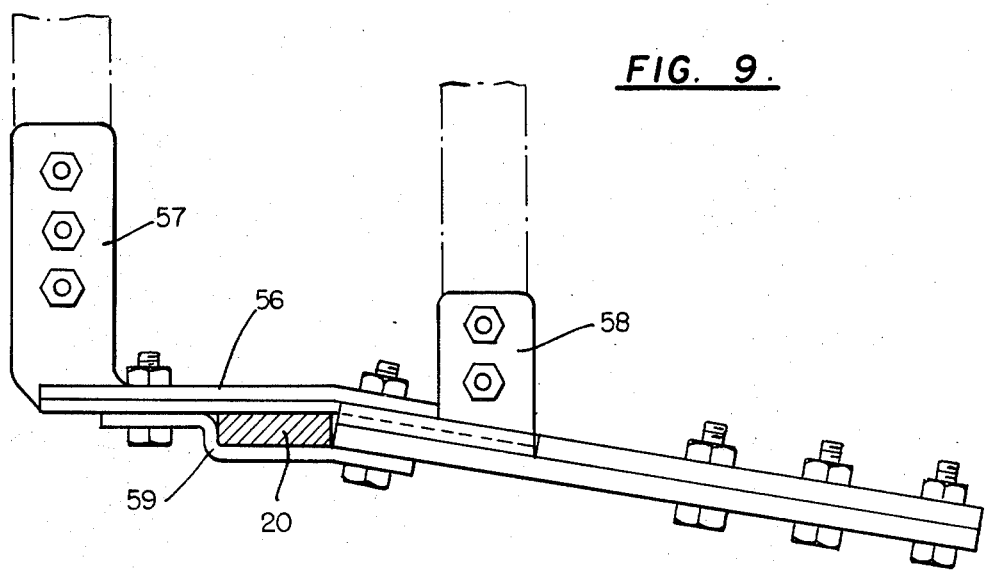
FIG. 9 is a view illustrating a bracket assembly for controlling the position of the strap in the horizontal plane.

Preferably, the strap 20 is formed from a straight section of steel, preferably stainless steel. As previously mentioned, the strap 20 when secured by the various mounting blocks to the lower spar cap 12 is formed with a dihedral therein, as best illustrated in FIG. 7. Also, because of the sweptback configuration of the wings, the strap must also have a sweepback angle, as shown in FIG. 8. This is accomplished by providing a clamping means at the location where the strap 20 is to be bent backward, as at 55 in FIG. 8. The clamping means for accomplishing this is shown in FIG. 9. As shown there, the clamping means comprises a bracket 56, which is provided with a flat portion forming a small angle with the plane of the strap 20, and upstanding portions 57 and 58. The latter are provided with apertures for bolting the bracket 55 to existing structural members on the aircraft. It will be apparent that when the ends of the strap 20 are secured to the ends of the wing spar there will be a tendency for the strap 20 to bend backwardly along its entire length. However, this tendency is constrained by the butting action of the portion 59 of bracket 55, which maintains the center portion of the strap 20 in alinement with the lower spar cap 12, but allows the outboard portions to be swept rearwardly, and thus remain alined with the rearward-sweeping portions of the lower spar cap 12.

Figure 10:
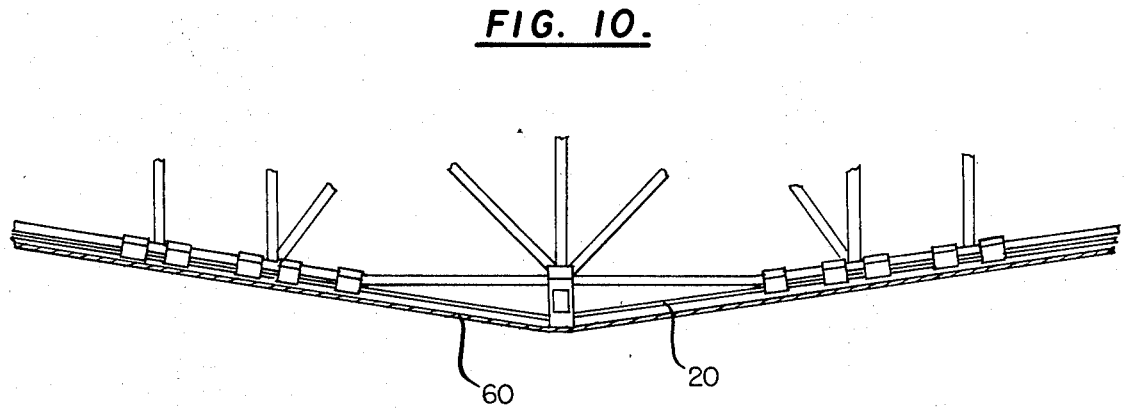
FIG. 10 is a view of the auxiliary strap shown in FIG. 1, and showing also fairing which covers the strap.

FIG. 10 illustrates the manner in which the wing spar modification of the present invention is completely concealed by a fairing 60, which completely covers the strap 20 and that portion of each clamp block which protrudes exteriorly of the aircraft stem. As a result, there is only a slight protuberance on the belly of the aircraft which, therefore, results in only minimal change in air flow, so that the flight characteristics of the aircraft are virtually unaffected by the installation of the modification.

Having described a modification for wing spar, I desire it to be understood that various modifications and alterations may be made to the specific form shown without departing from the scope of this invention.

I claim:

1. Apparatus for modifying the wing spar of an aircraft wherein the spar comprises at least one structural member extending transversely of the axis of the aircraft fuselage and comprising in combination:

an elongate metallic strap having a length corresponding substantially to that of said wing spar;

means coupling said strap to said wing spar, said coupling means maintaining said strap in substantially parallel relationship to said spar and operatively connecting said strap to said spar at a plurality of locations spaced along the length of said spar; and means for placing said strap in tension to thereby place said spar in compression in the absence of in-flight wing loading.

2. The apparatus of claim 1 in which said wing spar comprises generally parallel upper and lower spar cap members and a plurality of clamping means to clamp said strap to said lower spar at a plurality of locations along its length.

3. The apparatus of claim 2 in which each said clamping means includes a pair of clamp block members contoured to closely fit the cross section of said lower spar cap, means for securing together said two clamp block members, and means for securing said strap to one of said block members of each pair.

4. The apparatus of claim 3 in which said upper and lower spar cap members are joined at a plurality of locations by transverse members, and at the junction of said lower spar cap and at least some of said transverse members a triangular weblike metallic member is welded to both the lower spar cap and the intersecting transverse member, said block member of a pair which fits over the top of said lower spar cap defining a slit therein to receive said weblike portion to thereby permit the locating of said clamping means as closely as possible adjacent the intersection of said transverse member and said lower spar cap so as to minimize the application of bending moments to said lower spar cap.

5. The apparatus of claim 1 in which an L-shaped member couples each end of said strap to a respective end of said wing spar; first means pivotally coupling said L-shaped member adjacent the junction of its legs to said lower spar cap adjacent an end thereof, second means coupling the end of one of the legs of said L-shaped member to said strap, and third means coupling the other leg of said L-shaped member to said upper spar cap, said coupling of said L-shaped member to said upper spar cap reducing the compression load on said upper spar cap normally resulting from positive "g" loads on the aircraft wings.

6. The apparatus of claim 5 in which said strap is joined to a threaded member whose threaded portion is received within an aperture defined in said L-shaped member, and a nut adapted to be threaded onto the threaded portion which protrudes through said L-shaped member, whereby tightening of said nut places said strap in tension and compresses said lower spar cap, said connection of said L-shaped member to said upper spar cap providing a resistance to the application of a turning moment to said L-shaped member by reason of its connection to both said lower spar cap and said strap.

7. The apparatus of claim 5 in which both said upper and lower spar caps support respective upper and lower wing attach bolts extending generally parallel to the longitudinal axis of the aircraft, said first coupling means comprising the fitting of said lower wing attach bolt into an aperture in said L-shaped bracket, and said third coupling means comprising the fitting of said upper wing attach bolt into an aperture defined in a leg of said L-shaped member.

8. The apparatus of claim 5 in which said L-shaped member is bifurcated, the respective bifurcated arms having a spacing therebetween sufficient to accommodate the cross section of said upper and lower spar caps.

9. The apparatus of claim 2 in which said strap is external of the normal skin on the belly of the aircraft.

10. The apparatus of claim 2 in which the wings of the aircraft and thus also the wing spar are swept back and bracket means coupled to existing aircraft structural members abuts said strap along its trailing edge at the location along the wing spar outboard of which the wing sweepback occurs so as to prevent rearward bending of said strap inboard of said location.

11. Apparatus for attachment to an aircraft main wing spar of the type comprising generally parallel upper and lower members interconnected by a plurality of transverse members, said apparatus comprising:
- an elongate metal strap comprised of at least a single member and having a length corresponding substantially to that of the lower member of said spar;
- first means coupling said strap at a plurality of locations along its length to the lower member of said spar on the side thereof opposite the associated upper member;
- second means for each of said strap to couple said strap in tension to said lower member and thereby place a compressive load on said lower member in the absence of in-flight wing loading;
- said second means comprising a member pivotally connected to the end of the lower member and secured to both said strap at its end and to the upper member of the spar; and
- said second means further including means for adjusting the tension exerted on said strap by said member.